US009525653B2

(12) United States Patent
Buchhop et al.

(10) Patent No.: US 9,525,653 B2
(45) Date of Patent: Dec. 20, 2016

(54) ENHANCED WIRELESS SHORT MESSAGE SERVICE

(75) Inventors: Peter K. Buchhop, Cary, IL (US); Anne B. Fyk, Highland Park, IL (US)

(73) Assignee: Bank of America Corporation, Charlotte, NC (US)

( * ) Notice: Subject to any disclaimer, the term of this patent is extended or adjusted under 35 U.S.C. 154(b) by 1968 days.

(21) Appl. No.: 11/419,653

(22) Filed: May 22, 2006

(65) Prior Publication Data

US 2007/0270169 A1 Nov. 22, 2007

(51) Int. Cl.

*H04W 4/12* (2009.01)
*H04L 12/58* (2006.01)
*H04W 4/14* (2009.01)

(52) U.S. Cl.

CPC ................ *H04L 51/22* (2013.01); *H04W 4/14* (2013.01); *H04L 51/14* (2013.01); *H04L 51/38* (2013.01)

(58) Field of Classification Search

CPC .................................. H04Q 7/20; H04W 4/12
USPC ... 455/466, 414.1–414.4, 411, 419; 709/223, 215, 207
See application file for complete search history.

(56) References Cited

U.S. PATENT DOCUMENTS

| | | | | |
|---|---|---|---|---|
| 7,013,155 | B1 * | 3/2006 | Ruf et al. | 455/466 |
| 7,221,951 | B2 * | 5/2007 | Anvekar et al. | 455/466 |
| 7,308,477 | B1 * | 12/2007 | Gress et al. | 709/206 |
| 7,363,029 | B2 * | 4/2008 | Othmer | 455/414.4 |
| 2003/0065738 | A1 * | 4/2003 | Yang et al. | 709/215 |
| 2003/0078032 | A1 * | 4/2003 | Pei et al. | 455/411 |
| 2003/0125053 | A1 | 7/2003 | Pinault | |
| 2005/0233759 | A1 | 10/2005 | Anvekar et al. | |
| 2006/0128409 | A1 * | 6/2006 | Gress et al. | 455/466 |
| 2007/0011261 | A1 * | 1/2007 | Madams et al. | 709/207 |
| 2007/0266130 | A1 * | 11/2007 | Mazur et al. | 709/223 |

FOREIGN PATENT DOCUMENTS

| | | | |
|---|---|---|---|
| EP | 1 463 344 | A1 | 9/2004 |
| WO | 2004028108 | A2 | 4/2004 |
| WO | 2005018133 | A2 | 2/2005 |
| WO | 2005041549 | A1 | 5/2005 |

OTHER PUBLICATIONS

PCT International Search Report, PCT/US2007/069429, mailed Jan. 23, 2008, 10 pages.
PCT International Preliminary Report on Patentability, PCT/US2007/069429, mailed Dec. 11, 2008, 8 pages.
Office Action from related GB Application No. GB0821629.3 mailed Jun. 29, 2010 (3 pages).
EP Communication mailed Jun. 11, 2012 for EP Application No. 07797642.1.
Oct. 9, 2014—(CA) Office Action—App. 2653644.

* cited by examiner

*Primary Examiner* — Michael T Vu
(74) *Attorney, Agent, or Firm* — Banner & Witcoff, Ltd.; Michael A. Springs

(57) ABSTRACT

A wireless device for processing an SMS message stores the message on a local first storage device, and sends the message to a wireless carrier SMS facility. The device further stores the message from the first storage device on a second storage device that is remote from the wireless device.

4 Claims, 4 Drawing Sheets

ENHANCED WIRELESS SHORT MESSAGE SERVICE

FIELD OF THE INVENTION

One embodiment of the present invention is directed to wireless devices. More particularly, one embodiment of the present invention is directed to an enhanced short message service for wireless devices.

BACKGROUND INFORMATION

Short message service ("SMS") is the transmission of short text messages to and from a mobile phone, fax machine and/or IP address. Messages must be no longer than 160 alpha-numeric characters and contain no images or graphics. Messages are sent from the originating device to a Short Message Service Center ("SMSC") of the wireless carrier, which must then get it to the appropriate mobile device. SMS is becoming an increasingly popular form of communications, particularly in Europe and Asia, due to its low costs, ease of use, and its relatively high speed.

However, SMS has a number of drawbacks. For one, SMS messages are not logged or stored. This is a problem for corporations that for audit reasons are required to log all forms of communications. Second, SMS messages are not encrypted, so some corporations forbid SMS to be used to send sensitive information. Finally, SMS permits messages to be sent to only one recipient at a time. If the same SMS message is desired to be sent to multiple users, the message must by manually entered on the device multiple times.

Based on the foregoing, there is a need for an enhanced SMS that overcomes the above problems.

SUMMARY OF THE INVENTION

One embodiment of the present invention is a wireless device for processing an SMS message. The device stores the message on a local first storage device, and sends the message to a wireless carrier SMS facility. The device further stores the message from the first storage device on a second storage device that is remote from the wireless device.

DETAILED DESCRIPTION

One embodiment of the present invention is enhanced SMS that logs and encrypts SMS messages and that permits a single message to be simultaneously sent to multiple recipients. In one embodiment, SMS messages can be considered any message that is sent directly through a wireless carrier, in contrast to e-mail and other types of messages that are sent to e-mail application facilities, or other facilities, in addition to the wireless carrier.

Figure 1:
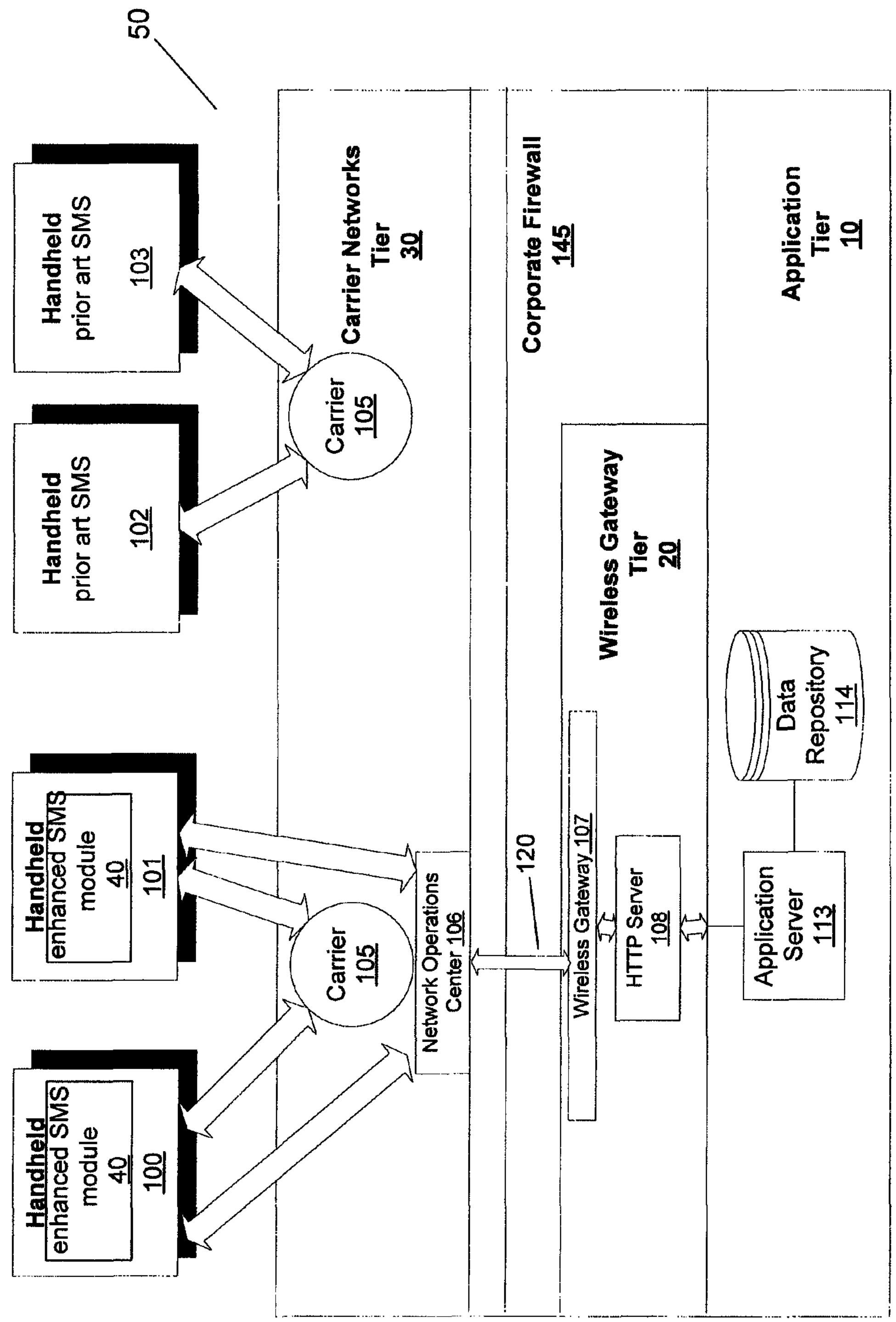
FIG. 1 is a block diagram of the functional elements of a system for sending and receiving enhanced SMS messages in accordance with one embodiment of the present invention.

FIG. 1 is a block diagram of the functional elements of a system 50 for sending and receiving enhanced SMS messages in accordance with one embodiment of the present invention. The functional elements shown in FIG. 1 can be implemented with any combination of hardware or software, including software executed by multiple computer systems or servers.

System 50 includes wireless handheld devices 100-103 that are used for wireless communications, including transmitting and receiving SMS messages. Wireless devices 100-103 can be any type of wireless or wired devices capable of transmitting and receiving SMS messages. In one embodiment, each of wireless data devices 100-103 include a storage/repository for storage of data and a processor for executing software instructions. Wireless devices 100 and 101 include an enhanced SMS module 40 in accordance to embodiments of the present invention and therefore send and receive SMS messages in accordance with embodiments of the invention as disclosed below. Wireless devices 102 and 103 execute prior art SMS to transmit and receive SMS messages.

System 50 further includes a wireless gateway 107 that includes one or more wireless HyperText Transfer Protocol ("HTTP") gateway servers 108 that take electronic information and make it compatible for transmission across a wireless network by encoding it in transmission protocols applicable to the wireless network. In one embodiment, gateway servers 108 are Servers executing a mobile data service. Wireless gateway 107 communicates this electronic data to a network operations center 106 across a communication network 120. Network operations center 106 monitors and manages various computer systems which interface to a carrier's wireless network 105. An application server 113 includes one or more application programs running on one or more application servers in a clustered environment. Application server 113 contains business rules and program logic, responds to user requests and processes and formats data in a manner consistent with wireless data devices 100-101. Application server 113 includes an SMS message upload module that, as disclosed below, interfaces with enhanced SMS module 40 to store SMS messages. The SMS message upload module is the server side companion component of the client-side enhanced SMS module 40. A data repository 114 provides long-term data storage for system 50. The storage may take the form of relational or hierarchical databases, sequential flat file storage, or any other method that allows data to be stored and retrieved.

Application server 113 and data repository 114 are coupled to each other and form the application tier 10 of system 50. Wireless gateway 107 (including wireless gateway servers 108) form the wireless gateway tier 20 of system 50 and is coupled to application tier 10. In a corporate or large entity environment, wireless gateway tier 20 and application tier 10 are typically configured behind a corporate firewall 145.

Wireless gateway 107 communicates with network operations center 106 through communication link 120 across the Internet. Network operations center 106 is typically owned and operated by the provider of wireless data devices 100-102. Network operations center 106 communicates to wireless data devices 100-101 via wireless carrier 105.

Wireless carrier 105 is the wireless provider through which the user of each wireless data device 100-103 subscribes to. Carrier 105 includes an SMSC which receives and transmits SMS messages. Network operations center 106 and wireless carrier 105 form carrier network tier 30. In one embodiment, wireless carrier 105 limits SMS message payloads to seven bits.

Prior art wireless devices 102 and 103 send and receive SMS messages by sending the message directly to wireless carrier 105. Thus, prior art SMS messages never pass through corporate firewall 145 and therefore, cannot be logged or stored by any devices behind corporate firewall 145. As disclosed above, the prior art SMS messages sent and received by devices 102 and 103 are not encrypted. In contrast, as disclosed below, SMS messages sent and received by devices 100 and 101 are encrypted and are stored on data repository 114.

Figure 2:
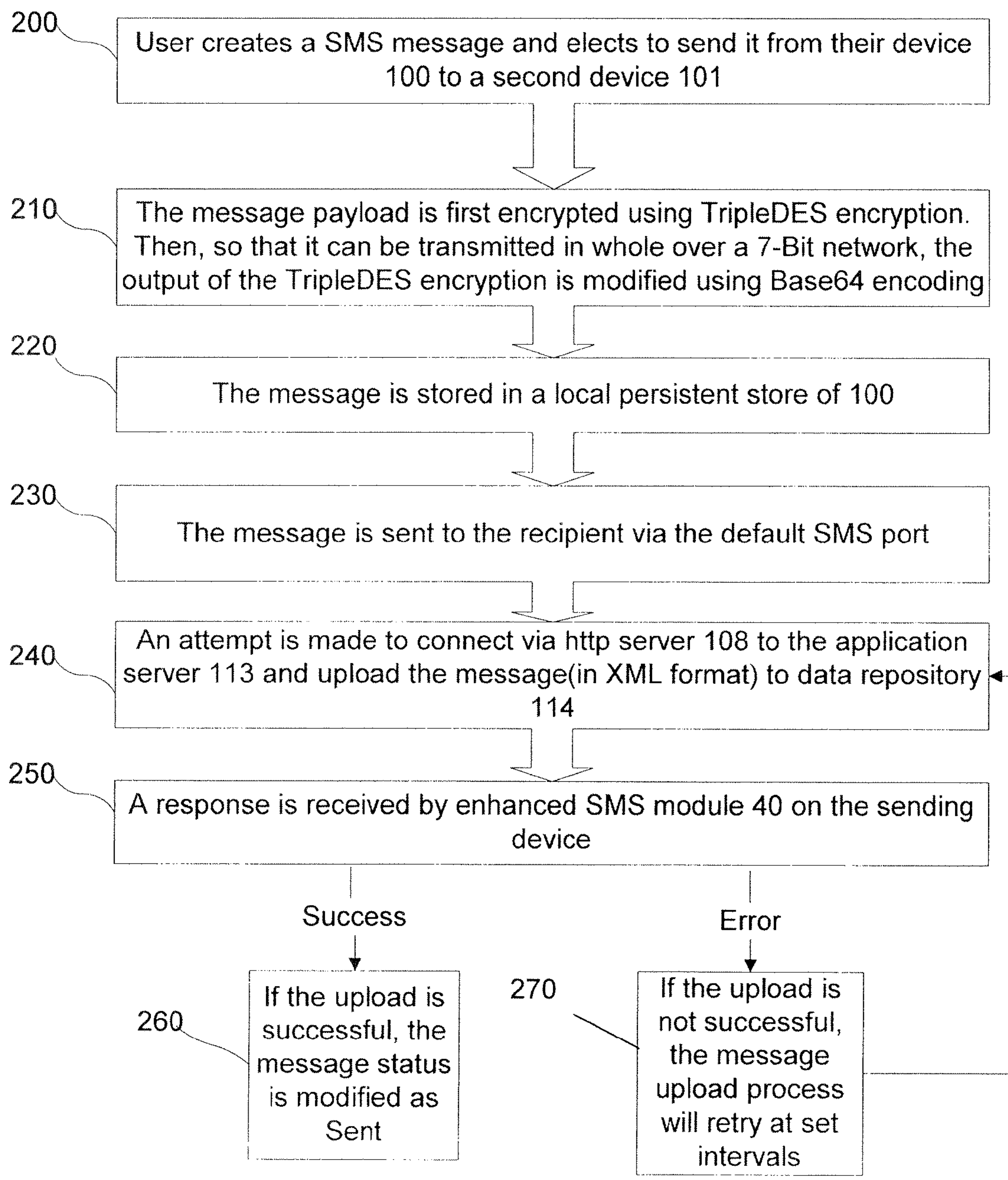
FIG. 2 is a flow diagram of the functionality performed by an enhanced SMS module on a handheld device and system to transmit SMS messages in accordance to one embodiment of the present invention.

FIG. 2 is a flow diagram of the functionality performed by enhanced SMS module 40 on handheld device 100 and system 50 to transmit SMS messages in accordance to one embodiment of the present invention. In one embodiment, the functionality is implemented by software stored in memory and executed by a processor. In other embodiments, the functionality can be performed by hardware, or any combination of hardware and software.

200: The user creates a SMS message and elects to send it from handheld device 100 to handheld device 101.

210: The message payload is first encrypted using TripleDES encryption in one embodiment. In other embodiments, other types of encryption can be used. The output of the TripleDES encryption is then modified using Base64 encoding. This allows the message to be transmitted in whole over the seven-bit network of carrier 105, In other embodiments, this modification is not necessary if the network is not limited to a specific number of bits.

220: The message is stored in the local persistent store of handheld device 100.

230: The message is sent to the recipient at device 101 via the default SMS port on carrier 105.

240: An attempt is made by enhanced SMS module 40 on device 100 to connect via http server 108 to application server 113 in order to upload the message in XML format to data repository 114. The request goes through carrier 105 to network operations center 106 then through wireless gateway 107 to HTTP server 108 and finally to application server 113 where it is processed by the SMS Upload module. The SMS Message Upload module parses the XML formatted request and updates data repository 114 with the information.

250: A response to the upload attempt is received by enhanced SMS module 40 on device 100. The SMS Message Upload module on application server 113 determines which response to send based on the success or failure of updating data repository 114. It sends an XML formatted response from application server 113 through HTTP server 108 via wireless gateway 107 to network operations center 106. From there it is sent via carrier 105 to device 100.

260: If the upload is successful, the message status on enhanced SMS module 40 is modified as "Sent".

270: If the upload is not successful, the flow will return to 240 and the message upload process will retry at set intervals.

Figure 3:
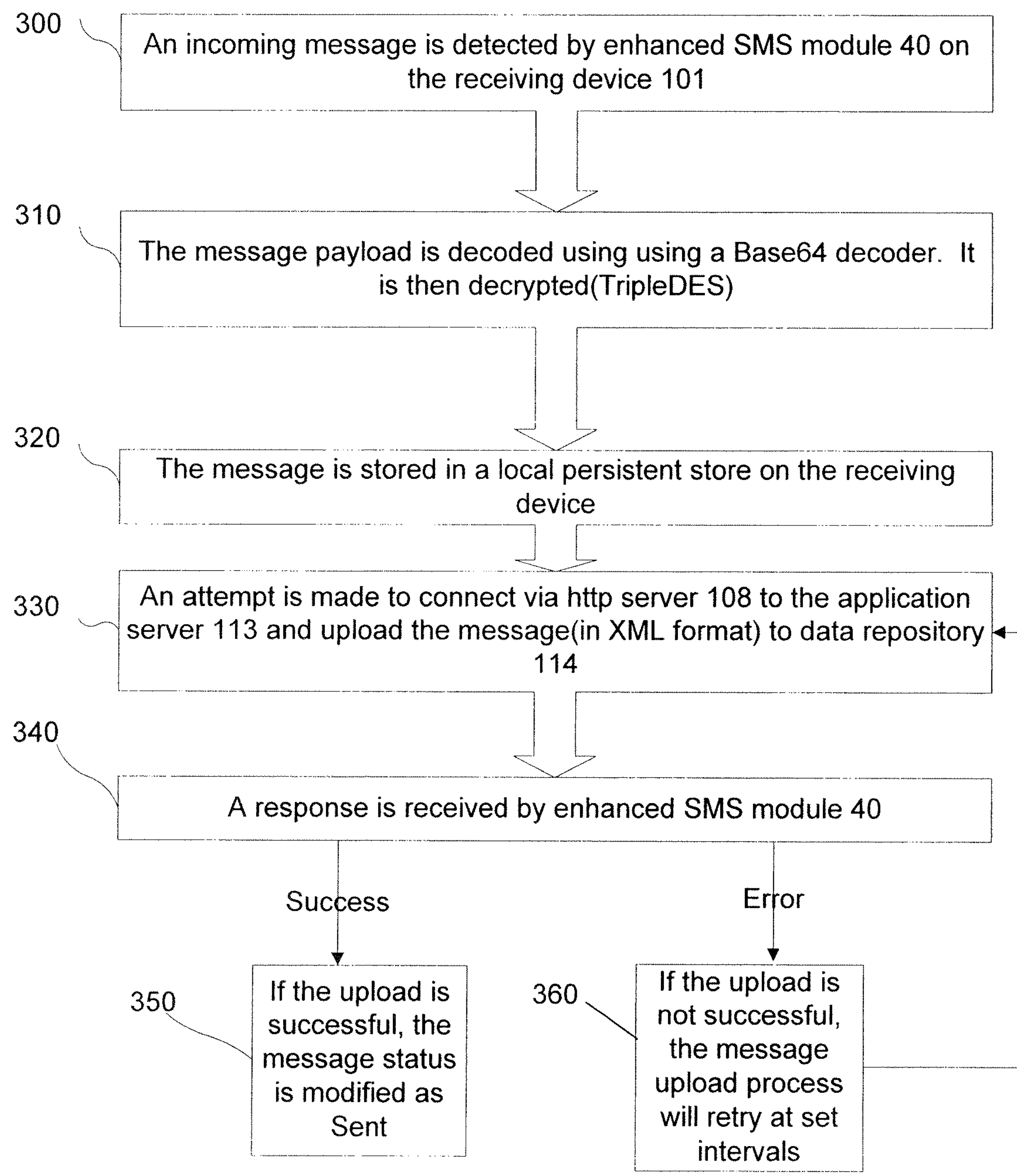
FIG. 3 is a flow diagram of the functionality performed by an enhanced SMS module on a handheld device and system to receive SMS messages in accordance to one embodiment of the present invention.

FIG. 3 is a flow diagram of the functionality performed by enhanced SMS module 40 on handheld device 101 and system 50 to receive SMS messages in accordance to one embodiment of the present invention. In one embodiment, the functionality is implemented by software stored in memory and executed by a processor. In other embodiments, the functionality can be performed by hardware, or any combination of hardware and software.

300: An incoming message is detected by enhanced SMS module 40 on the receiving device 101.

310: In one embodiment, the message payload is decoded using the using a Base64 decoder. It is then decrypted using TripleDES. In other embodiments, the reverse of any encoding or encryption used by the transmitting device is used at 310.

320: The message is stored in a local persistent store on receiving device 101.

330: An attempt is made by enhanced SMS module 40 on device 101 to connect via http server 108 to application server 113 in order to upload the message in XML format to data repository 114. The request goes through carrier 105 to network operations center 106 then through wireless gateway 107 to HTTP server 108 and finally to application server 113 where it is processed by the SMS Upload module. The SMS Message Upload module parses the XML formatted request and updates data repository 114 with the information.

340: A response to the upload attempt is received by enhanced SMS module 40 on device 101. The SMS Message Upload module on application server 113 determines which response to send based on the success or failure of updating data repository 114. It sends an XML formatted response from application server 113 through HTTP server 108 via wireless gateway 107 to network operations center 106. From there it is sent via carrier 105 to device 101.

350: If the upload is successful, the message status on enhanced SMS module 40 is modified as "Sent".

360: If the upload is not successful, the flow will return to 330 and the message upload process will retry at set intervals.

Figure 4:
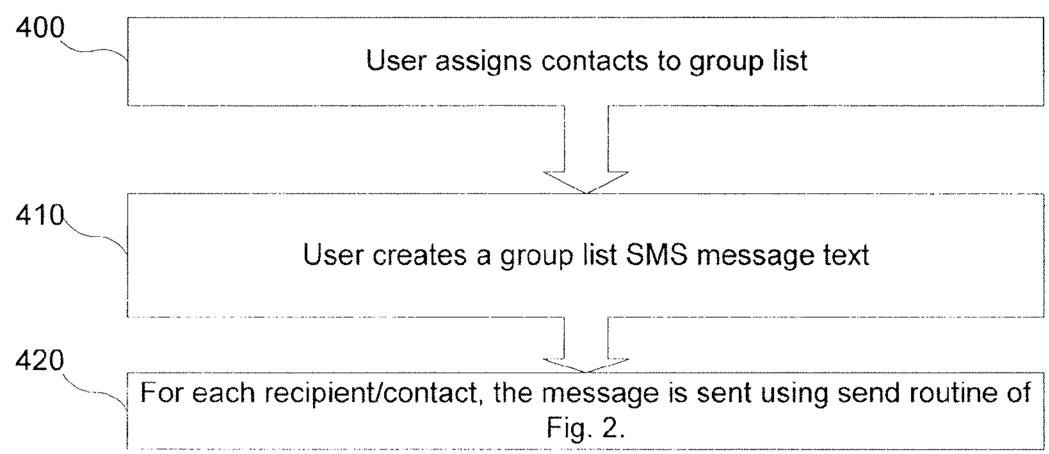
FIG. 4 is a flow diagram of the functionality performed by an enhanced SMS module on a handheld device and system to send a single SMS message simultaneously to a group of recipients in accordance to one embodiment of the present invention.

FIG. 4 is a flow diagram of the functionality performed by enhanced SMS module 40 on handheld device 100 and system 50 to send a single SMS message simultaneously to a group of recipients in accordance to one embodiment of the present invention. In one embodiment, the functionality is implemented by software stored in memory and executed by a processor. In other embodiments, the functionality can be performed by hardware, or any combination of hardware and software.

410: The user assigns contacts to a group list.

420: The user creates SMS message text to be sent to each contact on the group list.

430 For each recipient/contact on the group list, the SMS message is sent to the recipient using the send routine of FIG. 2. Therefore, the message is stored in data repository 114 and encrypted.

As disclosed, embodiments of the present invention retain a copy of all sent and received SMS messages, and encrypt all outgoing SMS messages for security reasons. Further, a single SMS message can be sent to a predefined group of recipients.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of processing a short message service (SMS) message comprising:

encrypting the SMS message;

storing the SMS message on a first storage device local to a wireless device;

sending the SMS message to a plurality of recipients; and storing in XML format the SMS message from the first storage device on a second storage device that is remote from the wireless device, wherein said storing the SMS message on the second storage device comprises:

connecting via a gateway server to an application server; and receiving a response from the application server that the storing of the SMS message is successful.

2. A wireless device comprising:

a processor; and a first memory device coupled to the processor and having stored thereon a short message service (SMS) module;

wherein said processor is adapted to execute the SMS module and:

encrypt a SMS message;

store the SMS message on the first memory device;

send the SMS message to a plurality of recipients; and store in XML format the SMS message from the first memory device on a second memory device that is remote from the wireless device by:

connecting via a gateway server to an application server; and receiving a response from the application server that the storing of the SMS message is successful.

3. A method of sending a short message service (SMS) message comprising:

receiving the SMS message;

sending the SMS message;

storing the SMS message on a local storage device;

attempting to store the SMS message on a remote storage device wherein said remote storage device is coupled to an application server and is located behind a corporate firewall;

receiving a result of the attempt to store the SMS message on the remote storage device; and if the result is unsuccessful, repeating the attempt to store the message.

4. A method of sending a short message service (SMS) message comprising:

receiving the SMS message;

sending the SMS message to a plurality of recipients;

storing the SMS message on a local storage device;

attempting to store the SMS message on a remote storage device wherein said remote storage device is coupled to an application server and is located behind a corporate firewall; and receiving a result of the attempt to store the SMS message on the remote storage device.

* * * * *